United States Patent [19]
Baebel

[11] Patent Number: 5,312,162
[45] Date of Patent: May 17, 1994

[54] PARTICULATE HANDLERS

[75] Inventor: Ronald G. Baebel, Dallas, Tex.

[73] Assignee: Ultra Polymer Sciences, Inc., Dallas, Tex.

[21] Appl. No.: 741,241

[22] Filed: Aug. 2, 1991

[51] Int. Cl.⁵ ............................................... B60P 1/00
[52] U.S. Cl. .................................... 298/1 B; 105/423; 220/410
[58] Field of Search ................ 105/279, 423; 298/1 B; 220/91, 410; 221/260; 414/393

[56]         References Cited
         U.S. PATENT DOCUMENTS

| 1,262,025 | 4/1918  | Dickson .       |           |
|-----------|---------|-----------------|-----------|
| 2,712,797 | 7/1955  | Woehrle et al. .|           |
| 2,931,523 | 4/1960  | Nelligan        | 105/423 X |
| 3,514,151 | 5/1970  | Hacker .        |           |
| 3,756,469 | 9/1973  | Clark et al. .  |           |
| 4,124,136 | 11/1978 | Bjelland et al. .|          |
| 4,133,451 | 1/1979  | Ratter .        |           |
| 4,314,788 | 2/1982  | Williams et al. | 298/1 B X |
| 4,453,875 | 6/1984  | Johnson, Sr.    | 105/423 X |
| 4,461,402 | 7/1984  | Fell et al. .   |           |
| 4,601,631 | 7/1986  | Van Raaij       | 298/1 B X |
| 4,801,042 | 1/1989  | Hamada et al. . |           |
| 4,909,156 | 3/1990  | Erickson .      |           |
| 5,024,346 | 6/1991  | Raser           | 220/410 X |

FOREIGN PATENT DOCUMENTS 1650486  5/1991  U.S.S.R. ................ 298/1 B

OTHER PUBLICATIONS

Engineering properties of Cyanaprene by American Cyanamid Company, Mar. 1984.

Primary Examiner—Michael S. Huppert
Assistant Examiner—Janice Krizek

[57]            ABSTRACT

An improved particulate handler that includes one or more elastic sheets that are particularly effective in facilitating the easy and complete removal of particulate from transporters or containers such as railroad cars, dump trucks, chutes and the like. The combination of the elastic sheets and supporting walls overcomes the problem with sticking of particulates to the interior surfaces and facilitates smooth and easy movement and/or removal under the influence of gravity and changes in tensile stresses and stretch that develop in the sheets during loading, unloading and conveying.

20 Claims, 5 Drawing Sheets

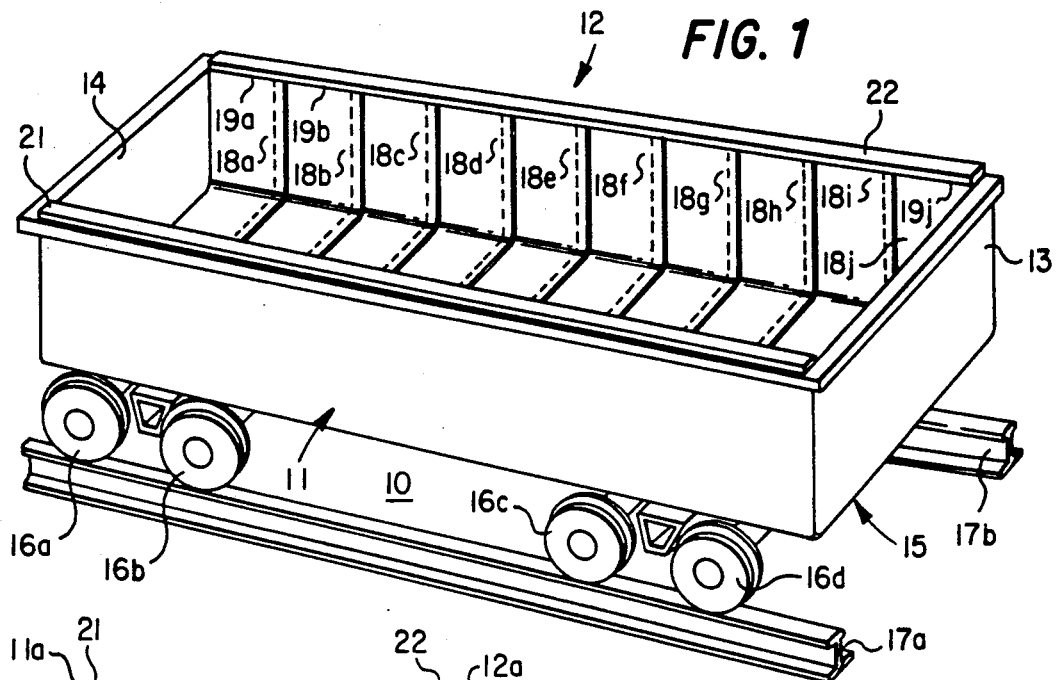
FIG. 1
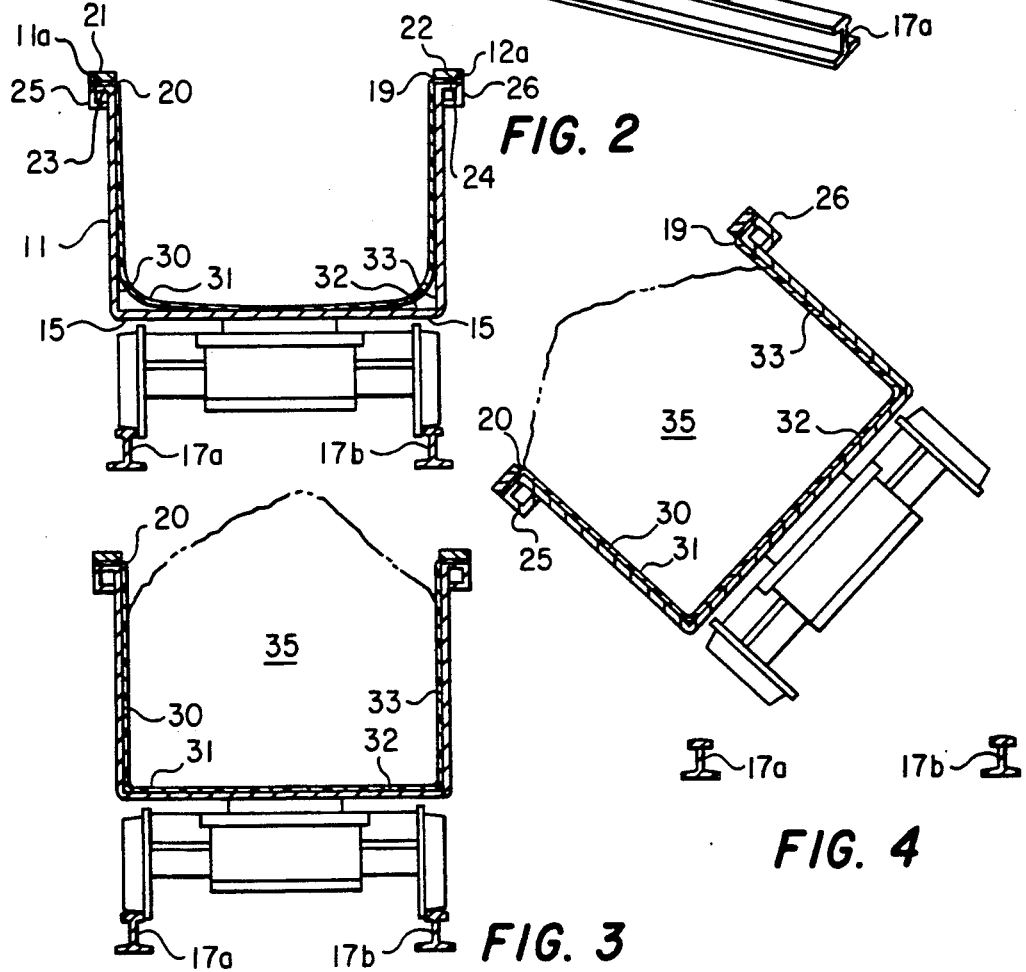
FIG. 2
FIG. 3
FIG. 4

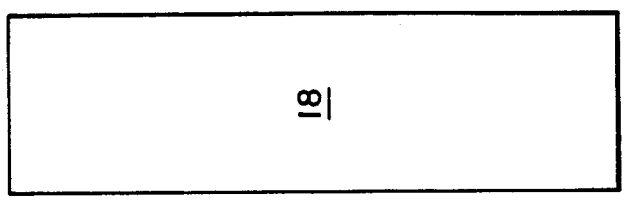
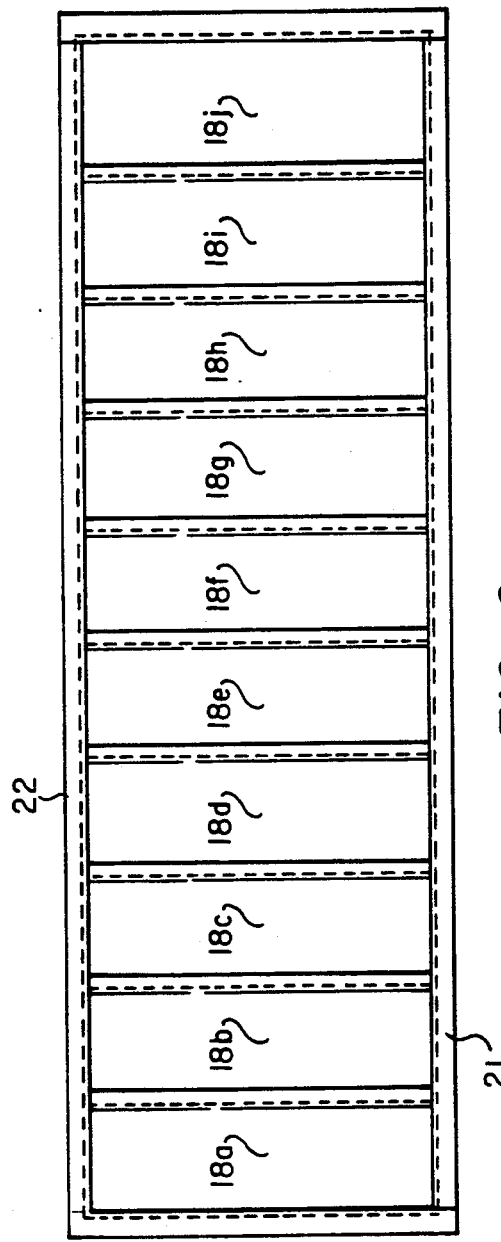
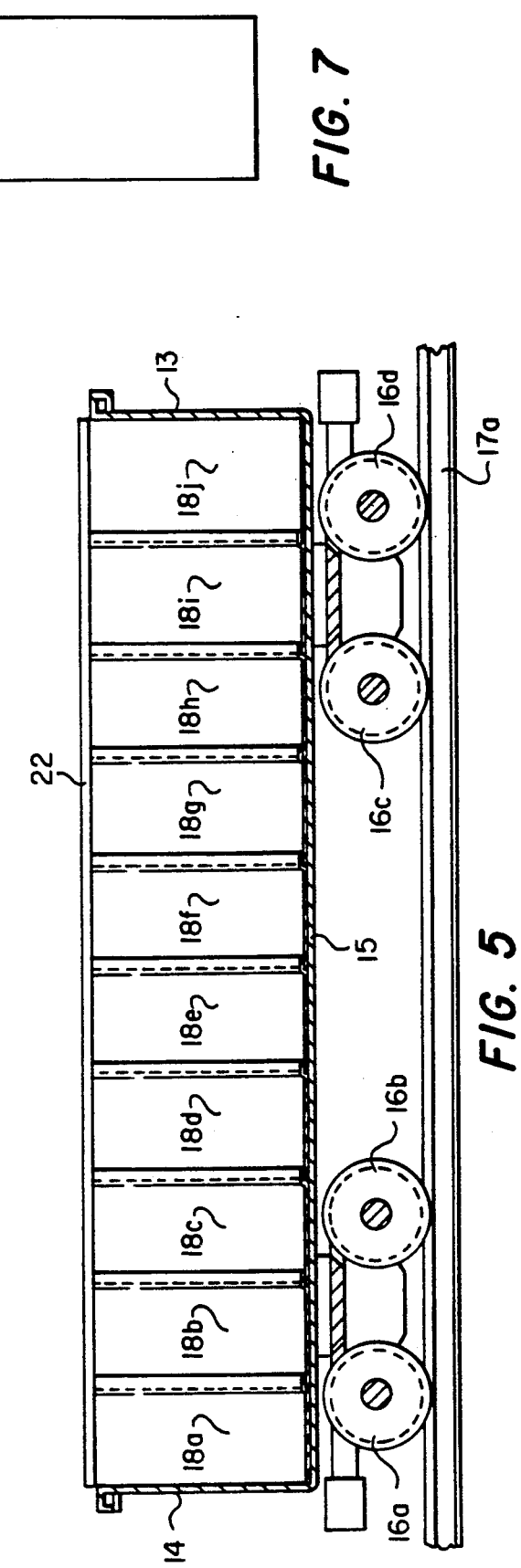

PARTICULATE HANDLERS

This invention relates to improved particulate handlers and transporters and more particularly to such handlers and transporters such as vessels that are specially adapted for use in handling, storing and transporting bulk particulates such as ores, coal, sand, fly ash and scrubber sludge.

BACKGROUND OF THE INVENTION

In modern industrial societies, large quantities of particulates require storage and/or transport from location to location. Thus, daily trainloads of coal are required to provide energy for many steam electric generating stations. In addition, large quantities of aggregates and by-products and/or waste materials require handling, storage and/or transport.

One major problem encountered in handling, conveying, storage and/or delivery of the foregoing materials is that of emptying them from the transporting vessel or storage receptacle. Thus, there is the problem of sticking due to hydrogen bonding to walls of the vessel, vehicle, container, or conveyor when water or other solutions are present. In addition, there is the problem of sticking arising when materials freeze.

Various proposals have been made to overcome or partly ameliorate the foregoing problems, for example, spraying loosening compounds into the interior of the vessel. Heating can, of course, be employed to ameliorate the adverse effects of freezing, and there have even been proposed giant car shakers that actually shake or vibrate rail cars that are being unloaded so as to shake loose the otherwise sticking materials. However, spraying has been found to be costly and only partly effective; heating requires equipment and the expenditure of time and energy; and vibrators and shakers are often expensive, bulky and can cause undesired damage.

In addition to the foregoing proposals, certain lining arrangements have been proposed, illustrative of which is that described in U.S. Pat. No. 4,453,875 which was granted to Theodore C. Johnson, Sr. on Jun. 12, 1984. According to that proposal, a wheel-supported open top transporting vessel such as a railway car is provided with a liner arrangement comprising a plurality of belt members arranged between the end walls of the car with the sides of adjacent ones of the belts overlapped in the direction between the end walls and with each belt overlying the side walls and bottom wall of the car. One end of each belt member is attached to the upper end of the corresponding one of the side walls and by upward displacement of the other end, each belt is adapted to be displaced upwardly relative to the car. Material in the car is progressively unloaded laterally outwardly of the car by sequential displacement of the belts in accordance with the pattern of overlap.

While the Johnson proposals may be effective in providing controlled evacuation of the contents from a railroad car, they teach that the "Material in the car is progressively unloaded laterally outwardly of the car by sequential displacement of the belts in accordance with the pattern of overlap." Thus, it would appear necessary to provide some means for physically elevating the belts in accordance with a controlled sequence, thus requiring actively employed equipment to impart the required controlled sequential motion. This, of course, entails expense, maintenance of the motion-imparting equipment, and operation thereof by an operator.

Accordingly, there has continued to be a need for a way to provide facilitated transfer, and improved emptying and/or evacuation of contents from passageways, particulate vehicles, containers or other handlers.

BRIEF SUMMARY OF THE INVENTION

The improvements according to the invention, include improved lined vessels such as containers, transporters, conveyors and/or communicating passageways and combinations thereof with lining sheets that have been discovered to provide particularly efficacious characteristics according to which particulates that have otherwise been found to stick to the walls or other adjacent surfaces readily disengage therefrom under the influence of gravity and internal tensile stress changes within the lining sheets, thus obviating the necessity for manual manipulation of belts and the like.

In accordance with a preferred embodiment, sheets of material having predetermined characteristics of elasticity, durability and abrasion resistance are attached at their ends to selected locations, e.g., at or near the upper extremities of the vessels (transporters or containers), whereby, when particulate matter is introduced into the interior thereof, its weight causes the sheets to stretch by a predetermined amount, thus developing tensile stresses therewithin. Accordingly, as material is removed from the vessel (transporter, other container chute or conveyor), the corresponding reduction of weight of the lessening quantity of material results in the controlled contraction of the lining, thus assisting evacuation and substantially reducing the sticking of the particulate materials. Thus, the linings and points of attachment assist in the unloading and/or prevention of sticking by the changes of tensile stresses (and stretch) in the linings, such tensile stresses and stretch producing vector forces against the material breaking down the internal cohesive forces, lowering the shear strength and coefficient of friction and helping to free the materials for conveying or discharge.

Further, in accordance with the preferred embodiments, the linings are made of urethane formulations which exhibit high tensile strength (in the neighborhood of 4000 psi to 6500 psi) and high elongation (450% to 540%) to minimize risk of rupture and facilitate unsticking of materials. They also have low hysteresis, that is, the materials have an excellent memory as to their unloaded configuration and return to their original condition after the stress of the weight of materials is lessened so as to be useful for multiple operations without losing tensile strength or original shape. In addition, a type of urethane material is preferably selected that contains an additive for protection against degradation by ultra violet light, e.g., that emitted by the sun, which is ordinarily encountered in outdoor use.

OBJECTS AND FEATURES OF THE INVENTION

It is one general object of the invention to improve particulate containers and transporters.

It is another object of this invention to improve assemblies of particulate containers or transporters and liners.

It is yet another object of this invention to facilitate emptying and/or unsticking of particulates and the like from materials handling, storage containers and/or transporters.

It is still another object of the invention to reduce maintenance costs of mechanical equipment utilizing mechanical unloading of transported materials.

It is yet another object of the invention to facilitate ease of replacement of equipment liners.

It is still another object of the invention to reduce abrasion of interior transporter/handler/container surfaces.

Accordingly, in accordance with one feature of the invention, a plurality of stretchy and easily installable stick-resistant sheets of lining materials are placed within a container so as to cover the interior walls to which materials would otherwise tend to adhere, thus reducing abrasion and preventing the sticking of materials to the walls of the container.

In accordance with another feature of the invention, the sheets are attached to the container along the tops only of two elongated sides of the container, thus facilitating installation and enhancing effectiveness.

In accordance with yet another feature of the invention, the sheets are effective to prevent sticking of the contents when used in a passive mode, thus obviating the necessity for providing an activator to assertively move the sheets to displace such contents.

In accordance with another feature of the invention, according to one preferred embodiment, complementary overlapping sections are provided to provide continuous coverage while permitting the sheets to move freely under the influence of gravity.

In accordance with yet another feature of the invention, the complementary overlapping sections may be made identical to each other, thus reducing the number of parts required, facilitating manufacture, stocking and installation.

In accordance with still another feature of the invention, where the principles of the invention are practiced with a conventional railroad car such as a coal car, the conventional car unloader that tilts the car sideways or upside down may continue to be employed without modification, thus facilitating use of the invention with existing equipment.

In accordance with yet another feature of the invention, the material from which the sheets are made exhibits qualities of abrasion resistance, hydrophobia and stretch under weight of loaded material such that when a container is tilted to unload it, progressive release of weight loading on the material causes the sheets to contract, thus contributing to effective unloading.

In accordance with another feature of the invention, when applying the principles of the invention to hopper cars or similar containers having hinged doors or walls, portions of the sheets are attached at predetermined positions on the containers so that when the doors or walls are swung about their hinges to open them, sheets of the materials are correspondingly stretched so as to assist in dislodgment of any particulate matter that may be attached thereto.

In accordance with yet another feature of the invention, in another preferred embodiment in which the principles of the invention are employed in particulate conducting chutes and in which vibration may or may not be normally employed to aid particulate flow, sheets of the material are advantageously employed in combination with or without conventional vibrators so as to improve the overall effectiveness of unimpeded material flow.

In accordance with another feature of the invention, in an alternate embodiment, a plurality of thinner sheets may be employed and stacked one upon another.

In accordance with yet another feature of the invention, the material from which the sectors are made is readily available material such as polyurethane.

These and other objects and features of the invention will become apparent from the following detailed description, by way of preferred examples, with reference to the drawings.

BRIEF DESCRIPTION OF THE DRAWING

FIG. 1 is a perspective view of a conventional railroad car in which sheets of material have been installed in accordance with the preferred embodiment of the invention;

FIG. 2 is a cross sectional view taken laterally through the car of FIG. 1 at right angles to the longitudinal axis thereof;

FIG. 3 is a cross sectional view similar to that of FIG. 2 except showing the car when loaded with material for transport;

FIG. 4 is a view similar to that of FIG. 3 except showing the car in a tilted (unloading) position;

FIG. 5 is a side sectional view depicting the car of FIG. 1 when in its normal material-transporting position;

FIG. 6 is a top plan view of the car of the preceding figures;

FIG. 7 is a view depicting one of the sheets of material that has been found particularly efficacious in practicing the principles of the invention;

DESCRIPTION OF A PREFERRED EMBODIMENT

Figure 8:
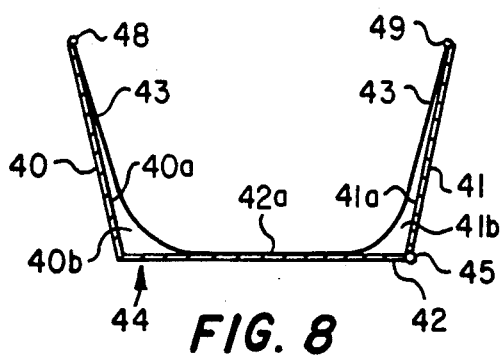
FIG. 8 is a sectional view of a sloping sided container depicting a hinge at one side.

Now turning to the drawing, and more particularly FIG. 1 thereof, it will be observed that it depicts a railroad type car generally shown at 10 having a front side 11, a rear side 12, a right hand end 13, a left hand end 14, a bottom 15, and wheels 16a-d. Also shown are a pair conventional rails 17a and 17b. Within the car 10 and disposed therein in accordance with the principles of the invention are a plurality of sheets of material 18a-18j which are selected from the class consisting of urethanes and polyurethanes. As will be observed from close inspection of FIG. 1, the sheets, e.g., 18a-18j, are shown as overlapping by an amount which is not critical to the practice of the concepts hereof. Any overlap sufficient to retain coverage of the underlying interior surfaces of the car itself during loading and unloading is acceptable. In this connection, it should be noted that although overlapping by such an amount approximating 3 inches has been found preferable, it is not essential to the practice of the invention that overlapping occur. The adjacent edges of the sheets could be essentially contiguous rather than overlapping although, as mentioned above, overlapping has been found to provide superior characteristics.

Further reference to FIG. 1 and sectional FIGS. 2-4 reveals that the sheets 18a-18j are affixed at their ends 19a-19j (shown in FIG. 1) and their opposite ends 20a-20j (not shown in FIG. 1 but illustrated by the symbol 20 in FIGS. 2-4) to the tops 11a and 12a of sides 11 and 12. Affixation can be accomplished by any of a variety of techniques well known in the art such as, for example, by sandwiching the end portions of the sheets between securing members comprising horizontal longitudinally disposed plates 21 and 22 and corresponding horizontal surfaces 23 and 24 of the flanged portions 25 and 26 of sides 11 and 12. Tightening and securing can then be completed by any one of a variety of conventional means such as, for example, by the use of through bolts (not shown) extending through apertures in plates 21 and 22 and corresponding apertures in horizontal surfaces 23 and 24.

Now turning to FIG. 2, it will again be observed that it depicts a cross sectional view taken laterally through the car of FIG. 1 at right angles to the longitudinal axis thereof when the car is in an empty condition. There, it will be observed that the length of each of the sheets 18 is sufficiently less than the overlain dimensions of the two sides 11/12 and the bottom 15 so that the sheets do not contact portions 30, 31, 32 and 33 of the interior surfaces of the sides 11/12 and bottom 15. This provides for stretching of the sheets 18 in response to the weight of loaded material when the car is filled so that the sheets 18 fully contact the interior surfaces of the car as shown in FIG. 3. As mentioned above, it is the tensioning and consequent stretching of the sheets under load that contributes substantially to the reduction of sticking of loaded materials and the consequent improvement in loading/unloading characteristics of the combination of car and lining.

Further reference to FIG. 3 reveals additional details depicted therein. Included is a representation of particulates such as coal, fly ash, pond sludge, scrubber sludge or other loaded materials 35. As mentioned above, as materials are loaded, the increasing weight of such loaded materials causes the sheets 18 to develop correspondingly increased internal tension until they stretch sufficiently to fit snugly against the interior surfaces 30-33. Further increases in quantity of loaded materials do not significantly change the longitudinal tension within the sheets since the additional weight is born by the sides and bottom of the car. Accordingly, by establishing the unloaded lengths of the sheets 18 at a predetermined value, a limit is established for the development of longitudinal tensile stresses, thereby establishing a way of advantageously limiting the tensile stress to which the sheets are subjected.

FIG. 4 illustrates the position of the car when in an unloading condition. As will be observed from an inspection of the figure, the entire car has been tilted into the position shown. This is conventional and has been extensively practiced in the prior art. Tilting of the car (as shown in FIG. 4) is achieved through manipulation of mechanisms well known in the art and may be accomplished by elevating one side while retaining the other at the previous height. Alternatively, it may be accomplished by rotating the car about its longitudinal axis, or by other techniques well known in the art. In any event, the car may be tilted as shown, turned on its side, or even turned upside down so as to empty the contents under the influence of gravity. As the material at the upper surface begins to tumble out of the car, the weight of the remaining contents decreases with the result that it reaches the point at which the contents impart just enough thrust against the sheets 18 to keep them in full contact with the interior walls of the car. Thereafter, as additional material is emptied, the sheets begin to contract, and as they do, their surfaces tend to decrease in area, thus breaking the bonding that may have occurred between the material and the surfaces with which they are in contact. Accordingly, the material is dislodged therefrom and falls freely out of the car. When the car has been entirely or essentially entirely emptied, the sheets resume the configuration depicted in FIG. 2 and await the introduction of the next load.

As mentioned above, FIG. 5 is a side sectional view depicting the car of FIG. 1 when in its normal material-transporting position. The preferred overlapping configuration of the sheets 18 is prominently seen therein.

FIG. 6 is a top plan view of the car of FIG. 1. Again, the positioning of the sheets 18 within the car is clearly illustrated.

As mentioned above, the characteristics of the sheets 18 are selected so as to cooperate with the geometries of the car and with the qualities of the contents and provide excellent performance in practice. The sheets 18 that have been found preferable for use in standard size railroad cars which are loaded with coal are as set forth below.

FIG. 7 is a view illustrating the preferred rectangular shape of the sheets 18. As an example of the dimensions that have been found preferable, the following pertain to a standard rail car adapted for transporting particulates such as coal: the inside dimensions of a car were measured and found to be 40 feet, 0 inches in length; 8 feet, 9 inches in width; and 3 feet, 6 inches in height.

The interior linear distance between the upper boundaries of the sides across the bottom measured 15 feet, 9 inches; and the characteristics of the sheets were as follows. The material was a urethane formulation, i.e., polyether methyl diisocyanate, which exhibits high tensile strength (in the neighborhood of 4000 psi to 6500 psi) and high elongation (of 450% to 540%) to minimize the risk of rupture during use. It also has a minimum of hysteresis, that is, it has an excellent memory as to its unloaded configuration and returns to its original condition after the unloading process is completed so as to be useful for multiple unloadings without losing its tensile strength or original shape.

For outdoor use, a type of urethane material is preferably selected that contains an additive for protection against degradation by ultra violet light, e.g., that emitted by the sun, which is ordinarily encountered outside. An example of such material is that which is commercially available from American Cyanamid Company and is sold under the Trade Mark CYANAPRENE as CYANAPRENE Urethane Elastomer. It is designated by American Cyanamid Company in its booklet titled *Engineering Properties of CYANAPRENE Urethane Elastomers* as the product which exhibits a Durometer A harness of 90 A. For the example described above, sheets of this material are preferably about 13 feet, 9 inches in effective length (i.e., the length from one interior edge of attachment to the other), about 4 feet, 3 inches in actual width, and 0.25 inches thick. Accordingly, the amounts and percentages by which the effective lengths of the sheets are less than the aforementioned linear distance along the interior surfaces between attachment points are approximately 2 feet and 14.8% (2/13.75), respectively.

In fitting out the car described in the preceding paragraph, a total of 10 sheets were used, thus providing an overlap of approximately 3 inches.

Although the above-identified material is believed to comprise the best mode, it should be noted that other materials are believed to offer attractive features. Thus, other materials include polyester methyl diisocyanate, polyether methyl diisocyanate, polyester touluene diisocyanate and polyether touluene diisocyanate.

As will be evident from reference to FIGS. 2-6, a well-known embodiment of particulate transporters includes sides that are essentially vertical. However, it has been found that sloping sides have advantages in some applications, and FIGS. 8-11 inclusive depict the principles of the invention embodied in transporters with such sides.

First, turning to FIG. 8, it will be observed that there is shown in section, a pair of sides 40 and 41, a bottom 42, and a sheet of elastic material 43. As with the embodiment of FIGS. 2-7, the length of sheet 43 is less than the sum of the corresponding linear measurements taken along the adjacent inner surfaces 40a, 41a and 42a of the transporter 44. In addition, there is provided at the intersection of side 41 and bottom 42, a hinge 45 which provides a swivelable connection permitting side 41 to swing into planar alignment with bottom 42 as depicted in FIG. 10.

Additional reference to FIG. 3 reveals the spaces 40b and 41b which occur when the transporter 44 is empty and which are similar to the corresponding spaces shown in FIG. 2. When the transporter 44 is filled with particulate matter 46 as shown in FIG. 9, spaces 40b and 41b essentially disappear due to the stretching of the elastic sheets as described in connection with the embodiment of FIGS. 2-6.

As mentioned above, transporters have been tilted, swivelled, rotated, shaken and even turned completely upside down in order to empty them. Accordingly, while the principles of the invention hereof are illustrated in the preferred embodiments which are shown and described herein, it should be understood that such principles are applicable to adaptations in which the particulate containers are tilted, swivelled, rotated, shaken and turned completely upside down.

Figure 9:
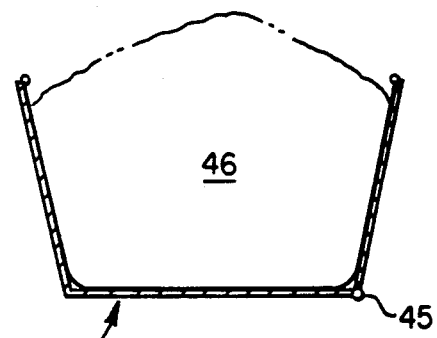
FIG. 9 is a view similar to that of FIG. 8 except showing the configuration of the elastic sheets when the container is loaded.
Figure 10:
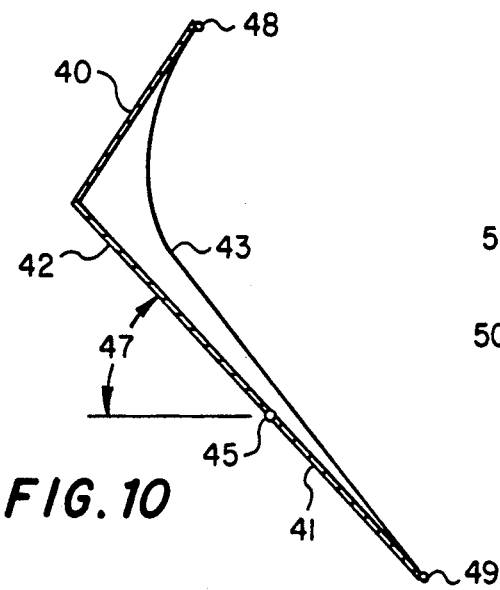
FIG. 10 is a view depicting the containers of FIGS. 8 and 9 when the container is tilted on one side and when the lower side is swung on its hinge into the open (unloading) position.

FIG. 10 illustrates the embodiment of FIGS. 8 and 9 when the container is rotated through an angle 47 of about 47 degrees and when side 41 is swivelled about hinge 45 into a position in which side 41 temporarily resides in the same plane as bottom 42. As will be evident to one skilled in the art, the angle of arc 47 is non-critical and may extend over a wide range of values.

Since sheet 43 is attached at or near its ends 48 and 49 to corresponding regions of the sides 40 and 41, when side 41 is released by latching or other means (not shown) well known in the art and is swung into the position shown in FIG. 10, sheet 43 tends to assume essentially the geometrical shape shown. However, since it is elastic, it will stretch under the weight of particulate matter 46 when such particulate matter overlies it as described above. As the major bulk of the particulate matter slides or is otherwise removed from its surface, sheet 43 tends to contract toward the shape shown in FIG. 10; and as it does, it tends to break bonds that may impede movement of the particulate material.

It is well known to those skilled in the art that particulate matter tends to cake into corners; and it will be evident from inspection of the drawings hereof that the elastic sheets are particularly effective in dislodging material that may have accumulated or caked in such corners.

Figure 11:
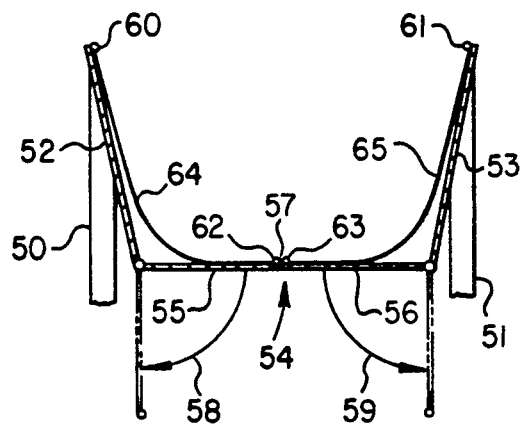
FIG. 11 is a sectional view of a sloping sided container having a pair of hinges, one at each lower corner, so that sectioned bottom panels can be swung down (as shown) to unload the contents.

Now turning to FIG. 11, it will be observed that it depicts another embodiment. There, it will be seen are partly shown typical container or transporting vehicle supports 50 and 51. Also shown are sides 52 and 53 which generally correspond to sides 40 and 41 in FIGS. 8-10. However, in contrast with the embodiment of FIGS. 8-10, the bottom 54 of the embodiment of FIG. 11 is divided into sections 55 and 56 which are normally latched together by conventional latch 57 so as to assume the position as shown in solid lines. However, when latch 57 is disengaged, sections 55 and 56 are allowed to swing under the influence of gravity through arcs 58 and 59 into the vertical positions that are shown in phantom. Since the pairs of ends 60,62 and 61,63 of the elastic sheets 64 and 65 are affixed as shown, the sheets are extended along the inner surfaces of the sides 52,53 and bottom sections 55,56, thus permitting and causing the elastic qualities of the sheets to result in causing corresponding changes in lengths of the sheets and corresponding loosening of any adhered particulate matter.

Figure 12:
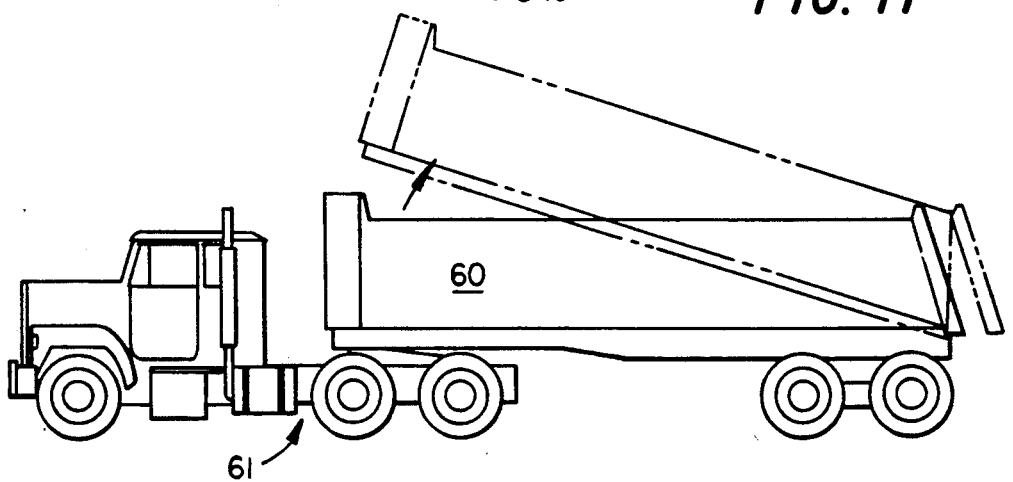
FIG. 12 is a side elevation view of a typical tractor-trailer truck of the prior art suitable for installation of sheets of elastic material according to the invention as further shown in FIGS. 13 and 14.
Figure 13:
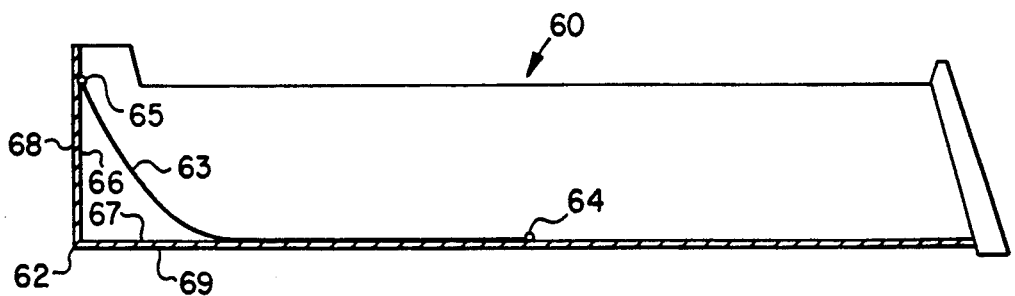
FIG. 13 is a partly-sectioned side elevation view of a portion of the truck trailer of FIG. 12 after elastic sheets have been installed according to the principles of the invention and when the trailer is empty.
Figure 14:
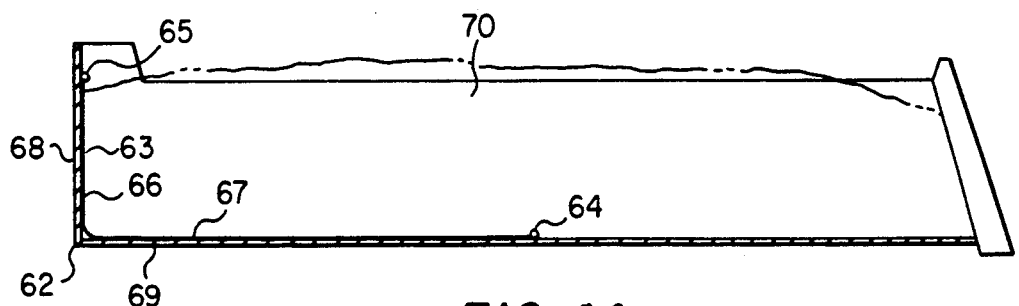
FIG. 14 is a side elevation view similar to that of FIG. 13 but with the trailer filled with particulate matter.

FIG. 12 is a side elevation of a typical tractor-trailer truck of the prior art which is shown to provide background for the inventive embodiments of FIGS. 13 and 14. As will be observed, FIGS. 13 and 14 are partly sectioned side elevation views of a trailer having an exterior appearance similar to the trailer portion 60 of truck 61 of FIG. 12.

As mentioned above, it will be recognized by those skilled in the art that particulate matter caking and build-up are particularly troublesome in corners such as corner 62 in FIGS. 13 and 14. Accordingly, the inventive principles hereof find particular efficacy in alleviating such problems. This is accomplished in a preferred embodiment by attaching one or more of the elastic sheet(s) 63 at attachment locations 64 and 65 such that the length of the sheet(s) is less than the corresponding distance as measured along the inner surfaces 66 and 67 of the wall 68 and bottom 69 of the trailer 60. Accordingly, when the trailer 60 is unloaded as shown in FIG. 13, the sheet(s) 63 assume the position therein depicted. As in the examples described above, when a load 70 of particulate material is present (as shown in FIG. 14), the weight of the particulate material is sufficient to stretch sheet 63 into the shape such that it essentially follows the form of the inner surfaces 66 and 67. Again, as with the examples described above, when unloading occurs, as part of the particulate material is discharged and the weight of the remainder imposes reduced stress on sheet 63, it begins to contract, thus assisting in breaking loose any particulate matter that may have adhered to it. When the trailer is completely emptied, the sheet 63 essentially re-assumes the shape depicted in FIG. 13.

Figure 15:
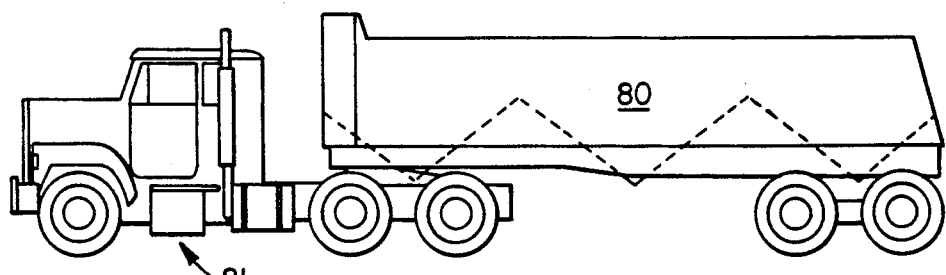
FIG. 15 is a side elevation view of a prior art tractor-trailer truck with a hopper trailer suitable for installation of sheets according to the invention.
Figure 16:
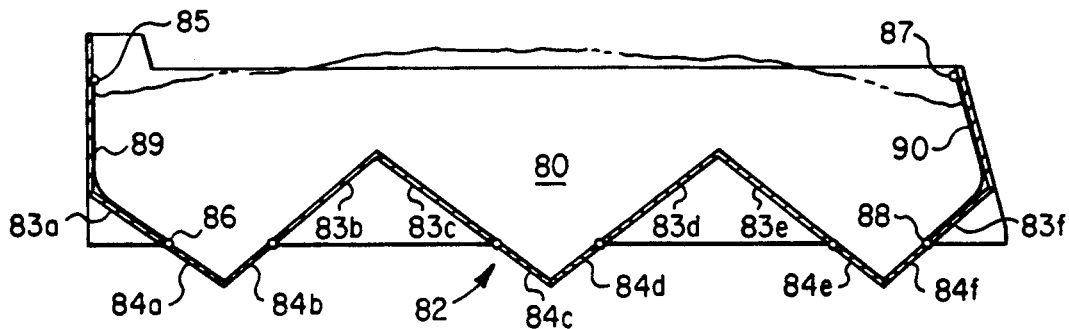
FIG. 16 is a partly-sectioned side view of the hopper trailer of FIG. 15 when loaded and depicting sheets of elastic material placed in accordance with the principles of the invention.
Figure 17:
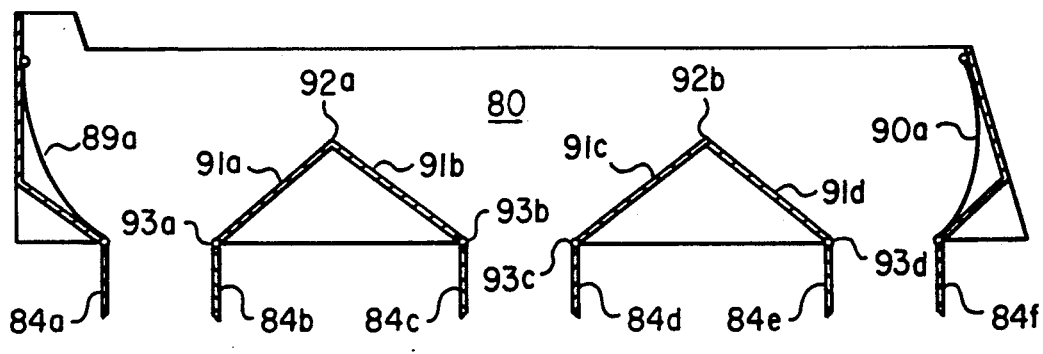
FIG. 17 is a view similar to that of FIG. 16 but showing the unloading gates in the open positions and the configurations of the elastic sheets when the trailer is empty.

FIG. 15 is a side elevation of another tractor-trailer truck of the prior art which is shown to provide background for the inventive embodiments of FIGS. 16–17. FIGS. 16 and 17 are partly sectioned side elevation views of a trailer corresponding to the trailer portion 80 of truck 81 in FIG. 15. As will be observed, the bottom 82 is made up of a plurality of non planar sections 83a-83f. These sections are configured so that when the unloading gates 84a-84f are closed (FIG. 16), they form generally triangular shapes as shown.

Within the interior of trailer 80, and attached at points 85–88, are two sheets 89 and 90 of the elastic material. Since in FIG. 16, the trailer is shown to be filled with particulate, the sheets 89 and 90 are seen to be stretched so as to conform essentially to the corresponding adjacent surfaces as described in connection with the preceding figures. However, when the unloading gates 84a-84f are swung open as shown in FIG. 17, thereby releasing the contents, and as the weight of particulate material on sheets 89 and 90 is correspondingly reduced, sheets 89 and 90 contract until they assume the shapes 89a and 90a. Again, as in the foregoing examples, the contraction of the elastic sheets loosens any attachment of the particulate material to the surface and assists in its discharge from the trailer.

Further reference to FIG. 17 reveals no elastic sheets overlying interior surface portions 91a-91d. However, if the particulate material is particularly prone to sticking, sheets may be provided over the surfaces 91a-91d. They may be attached at the apex points 92a-92b and either at hinge locations 93a-93d or at points lower down on gates 84a-84f.

Figure 18:
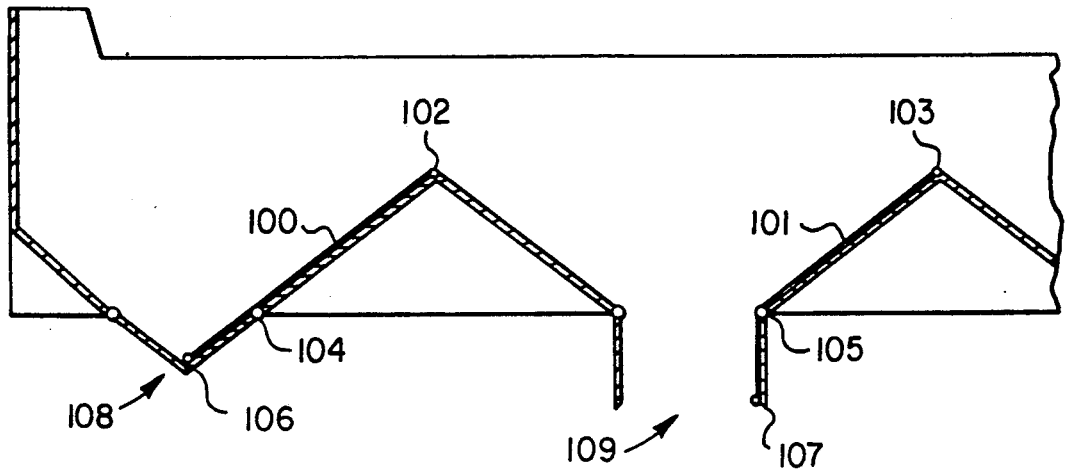
FIG. 18 is a view of an alternate embodiment depicting the deployment of sheets of elastic material overlying different parts of the interior surfaces.

FIG. 18 illustrates the application of the principles of the invention to trailers, train cars or other containers in which the triangular trough geometries are positioned approximately at 90 degrees to those of FIGS. 16 and 17. As will be observed from reference to FIGS. 16 and 17, the sequence of the triangles is along the major front to back axis of the trailer or container; whereas in FIG. 18, the sequence of the triangles is transverse to the main front-to-rear axis of the trailer/container. For convenience in illustration, gate 109 is shown in the open condition and gate 108 in the closed condition. Also in FIG. 18, the sheets of material 100 and 101 are shown extending from the triangle apex points 102 and 103 past hinges 104 and 105 to points near the ends 106 and 107. It will be evident that when a gate is opened, the material of sheets 100 and 101 will be stretched, thereby assisting in the dislodging of any particulate material that may be adhered thereto.

In material handling equipment there often are included interconnecting passageways through which particulates flow; and such passageways often contain geometries that result in undesired accumulations of conducted materials. The principles of the invention may find application to such passageway geometries so as to inhibit such undesired accumulations. This will be observed from reference to FIGS. 19 and 20.

Figure 19:
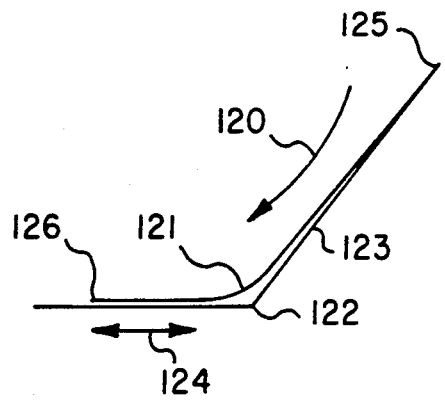
FIG. 19 illustrates an embodiment of the invention when employed within particulate conducting chutes which may be vibration-free or be accompanied by vibration.
Figure 20:
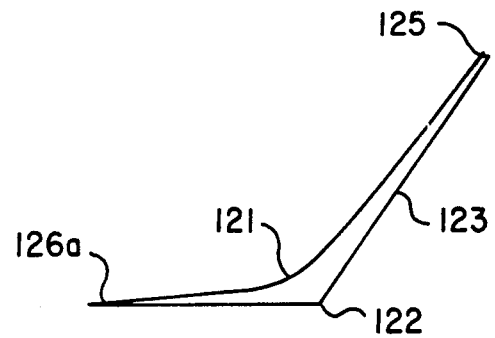
FIG. 20 illustrates an embodiment of the invention which is an alternative to the embodiment of FIG. 19.

FIG. 19 illustrates a side elevation section of a portion of a chute in which materials flow in the direction of arrow 120. In the absence of sheet 121, particulate materials tend to build up in locations such as that identified by symbols 122. Therefore, it has been conventional to shake or vibrate the side walls (represented by side wall 123) as indicated by double-ended arrow 124. While such shaking or vibration delays build-up to prohibitive levels, such build-up often continues at a slower rate but typically rises to a level at which the equipment must be stopped and build-up manually removed. However, when a sheet 121 of the above-described material is disposed as shown in FIGS. 19 or 20, its characteristics (as described above) interact in combination with the vibration of the walls of the passageway so as to greatly enhance the effectiveness of vibration and dramatically extend the period of time before any manual material removal has to be undertaken. Moreover, in some installations, the vibratory action on the sheets by impinging particulate alone may be sufficient to prevent or delay build-up, thus obviating the necessity for the provision of separate vibratory action.

As will be observed from further reference to FIG. 19, the sheet 121 may be attached only at its upper extremity as shown at 125, with the lower end 126 remaining free; or, as illustrated in FIG. 20, the sheet 121 may be attached at its upper end as shown at 125 and also attached at its lower end as shown at 126a. Selection as between the embodiments of FIGS. 19 and 20 depends upon the characteristics of the particulates, the geometries of the chute, and the characteristics of the vibrator.

It will now be evident that there is disclosed herein a plurality of preferred embodiments in which the elastic properties of sheet materials are efficaciously exploited in combination with mechanical particulate handling equipment so as to result in the solution of long-encountered problems of overcoming the caking and/or sticking of particulate materials to the walls of containers, transporters, ducts and the like.

Although the invention hereof has been described by way of example of preferred embodiments utilizing identified materials, it will be evident that other adaptations and modifications can be employed without departing from the spirit and scope thereof. Thus, for example, other types of materials exhibiting the desired characteristics of smooth surfaces, stretchability, strength and resistance to abrasion could be employed. Moreover, twin sheets of overlying materials of lesser thickness could be employed. In addition, as mentioned above, non-overlapping but contiguous sheets could be utilized.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An improved particulate vessel having a bottom portion and a pair of opposed side walls extending from said bottom portion defining sides of said vessel, each of said side walls having upper extremities, and a plurality of sheets of intentionally stretchable non-stick material, each of said sheets having two opposite ends, one of said opposite ends of each of said sheets being attached to the upper extremity of a first one of said pair of opposed side walls and the other of said opposite ends of each of said sheets being affixed to the upper extremity of the other of said pair of opposed side walls, said sheets being disposed in partly overlapping positions thereby to normally cover only predetermined surfaces less than the entire interior of said vessel.

2. An improved particulate vessel according to claim 1 in which said predetermined surfaces include inner surfaces of said bottom portion.

3. An improved particulate vessel according to claim 1 in which said predetermined surfaces include inner surfaces of said pair of opposed side walls.

4. An improved particulate vessel according to claim 2 in which said predetermined surfaces include inner surfaces of said pair of opposed side walls.

5. An improved particulate vessel according to claim 1 in which said stretchable non-stick material is selected from the class consisting of urethanes and polyurethanes.

6. An improved particulate vessel according to claim 2 in which said stretchable non-stick material is selected from the class consisting of urethanes and polyurethanes.

7. An improved particulate vessel according to claim 3 in which said stretchable non-stick material is selected from the class consisting of urethanes and polyurethanes.

8. An improved particulate vessel according to claim 4 in which said stretchable non-stick material is selected from the class consisting of urethanes and polyurethanes.

9. An improved particulate vessel having an essentially planar bottom portion residing in a first plane and a pair of essentially planar opposed side walls, each of the pair of side walls respectively defining a second plane and a third plane essentially parallel to each other and extending from said bottom portion and defining sides of said vessel, each of said side walls having an upper extremity defining a line lying in a plane essentially parallel to said first plane, and a plurality of sheets of stretchable urethane material, each of said sheets having two opposite ends, one of said opposite ends of each of said sheets being rigidly affixed at a first position of attachment to the upper extremity of a first one of said pair of opposed side walls and the other of said opposite ends of each of said sheets being rigidly affixed at a second position of attachment to the upper extremity of the other of said pair of opposed side walls, said sheets being disposed in partly overlapping positions thereby to completely cover predetermined surfaces of the interior of said vessel.

10. An improved particulate vessel according to claim 9 in which the lengths of said sheets are less by a predetermined amount than the most direct lateral distance between said first position of attachment and said second position of attachment measured along the inner surfaces of said opposed side walls and said bottom portion.

11. An improved particulate vessel according to claim 10 in which said predetermined amount is a length by which said sheets of stretchable material stretch when particulates are fully loaded into said vessel to cause said sheets to stretch to the length of said most direct lateral distance.

12. An improved particulate vessel according to claim 9 in which said urethane material is polyurethane.

13. An improved particulate vessel according to claim 10 in which said urethane material is polyurethane.

14. An improved particulate vessel according to claim 11 in which said urethane material is polyurethane.

15. An improved particulate vessel according to claim 10 in which said predetermined amount is about 15 percent of said most direct lateral distance.

16. An improved particulate vessel according to claim 11 in which said predetermined amount is about 15 percent of said most direct lateral distance.

17. An improved particulate vessel according to claim 15 in which said urethane material is polyurethane.

18. An improved particulate vessel according to claim 17 in which said urethane material is a CYANAPRENE brand urethane elastomer having a Durometer A hardness of about 90.

19. The method of loading and unloading a particulate transporter comprising the steps of:
   a. providing an improved particulate transporter having an essentially planar bottom portion residing in a first plane and a pair of essentially planar opposed side walls defining a second plane and a third plane and extending from said bottom portion and defining sides of said transporter, each of said side walls having an upper extremity defining a line lying in a plane essentially parallel to said first plane;
   b. positioning a plurality of elongated sheets of stretchable urethane material within said particulate transporter, each of said elongated sheets having a first end and a second end at opposite extremities of each of said sheets;
   c. disposing said elongated sheets of material within said particulate transporter to overlie the interior surfaces of said side walls while avoiding contact with at least a substantial portion of said interior surfaces when said particulate transporter is empty; and
   d. affixing said first end of each of said sheets to said upper extremity of one of said side walls and the second of said ends to said upper extremity of the other of said pair of opposed side walls.

20. The method of claim 19 further including the step of overlapping sides of said sheets.

* * * * *